United States Patent
Yoshida et al.

(10) Patent No.: US 11,420,646 B2
(45) Date of Patent: Aug. 23, 2022

(54) CONTROL SYSTEM

(71) Applicant: TOYOTA JIDOSHA KABUSHIKI KAISHA, Toyota (JP)

(72) Inventors: Jun Yoshida, Toyota (JP); Ken Imamura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 22 days.

(21) Appl. No.: 17/029,593

(22) Filed: Sep. 23, 2020

(65) Prior Publication Data

US 2021/0179126 A1    Jun. 17, 2021

(30) Foreign Application Priority Data

Dec. 13, 2019  (JP) .............................. JP2019-225016

(51) Int. Cl.
*B60W 50/08* (2020.01)
*B60R 25/20* (2013.01)
*B60W 50/06* (2006.01)

(52) U.S. Cl.
CPC ........... *B60W 50/085* (2013.01); *B60R 25/20* (2013.01); *B60W 50/06* (2013.01); *B60W 2540/10* (2013.01)

(58) Field of Classification Search
CPC .... F02D 11/105; B60W 50/085; B60W 50/06
See application file for complete search history.

(56) References Cited

U.S. PATENT DOCUMENTS

| | | | |
|---|---|---|---|
| 4,691,677 A * | 9/1987 | Hotate | F02D 11/105 123/399 |
| 2014/0372012 A1* | 12/2014 | Darnell | F02D 41/021 701/115 |
| 2016/0273469 A1* | 9/2016 | Takeyoshi | F02D 41/10 |
| 2017/0089274 A1* | 3/2017 | Kolhouse | F02D 11/105 |
| 2018/0258866 A1* | 9/2018 | Bellino | F02D 11/02 |
| 2020/0132002 A1* | 4/2020 | Wanibe | F02D 41/0002 |

FOREIGN PATENT DOCUMENTS

JP    H10-009012 A    1/1998

* cited by examiner

*Primary Examiner* — Russell Frejd
*Assistant Examiner* — Sara J Lewandroski
(74) *Attorney, Agent, or Firm* — Oliff PLC

(57) ABSTRACT

A driving apparatus is controlled by using a driving command that is obtained by applying an accelerator operation amount to a relation between the accelerator operation amount and the driving command for the driving apparatus, and the relation is set by using a distribution of usage of the driving command by a driver such that a gradient that is a change in the driving command with a change in the accelerator operation amount in a high usage range including a value having a longest usage time among values of the driving command is less than the gradient in a range other than the high usage range.

6 Claims, 4 Drawing Sheets

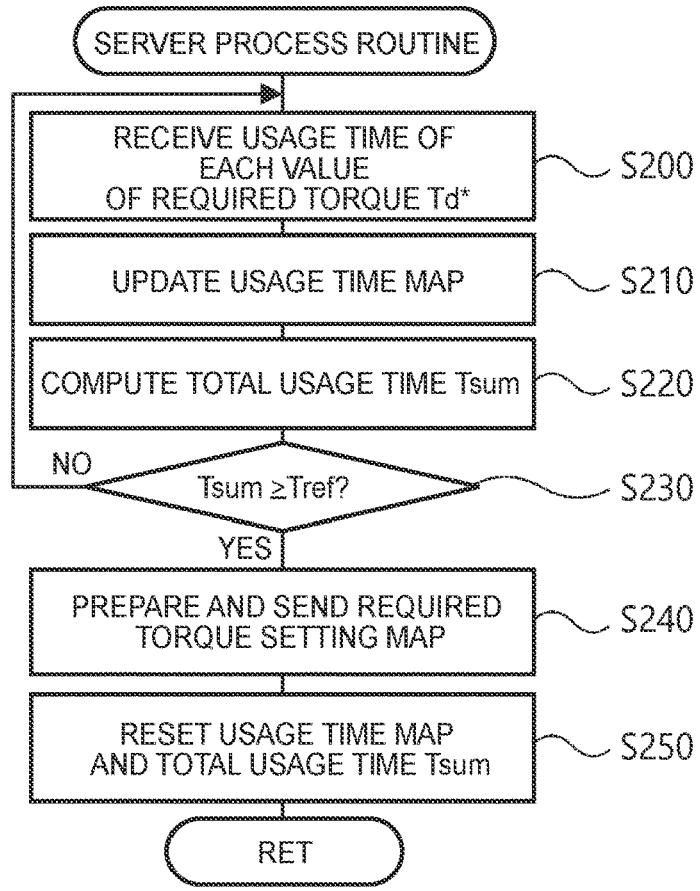
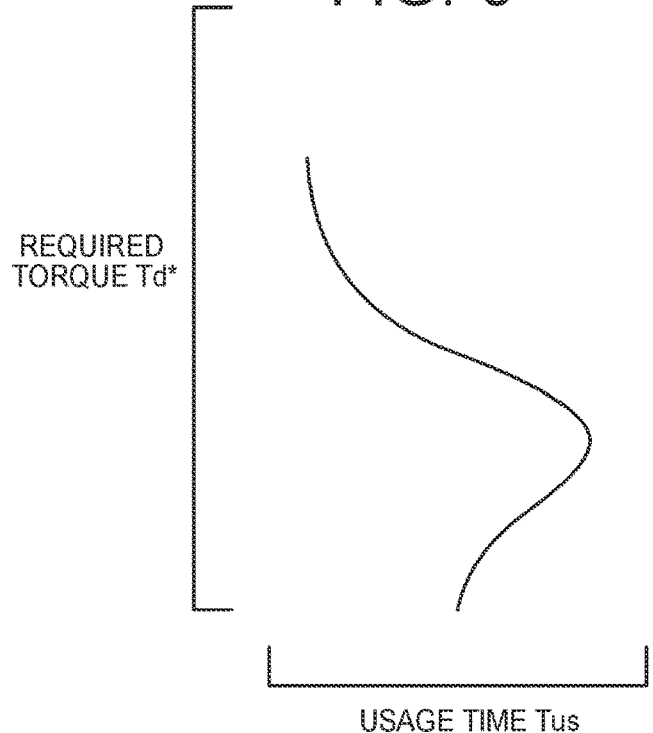

CONTROL SYSTEM

CROSS-REFERENCE TO RELATED APPLICATION

This application claims priority to Japanese Patent Application No. 2019-225016 filed on Dec. 13, 2019, incorporated herein by reference in its entirety.

BACKGROUND

1. Technical Field

The present disclosure relates to a control system.

2. Description of Related Art

As this type of technique, a throttle controller for an internal combustion engine has been proposed (see, for example, Japanese Unexamined Patent Application Publication No. 10-009012 (JP 10-009012 A). The throttle controller sets a target throttle opening degree of the internal combustion engine in accordance with a driver's accelerator operation and drives a throttle valve. The throttle controller changes the control characteristics of the target throttle opening degree for a physical quantity of accelerator operation based on accelerator operation statistics that represent a distribution of a historical physical quantity (accelerator operation speed, accelerator operation acceleration, or accelerator depression amount) of accelerator operation when the driver makes an acceleration request. The throttle controller for an internal combustion engine determines whether to change the control characteristics by comparing a current physical quantity of accelerator operation with a reference value of at least one of an inflection point, a standard deviation, a median value, and a cumulative frequency of the accelerator operation statistics. Thus, the throttle controller is capable of changing the control characteristics such that the driver's acceleration request is satisfied.

SUMMARY

In general, a usage time of each value of driving command to drive a driving apparatus (a driving apparatus installed in a mobile object, such as a vehicle, or a driving apparatus installed in stationary equipment, such as construction equipment) including an internal combustion engine and the like varies among users. The throttle controller for an internal combustion engine is capable of dealing with a driver's acceleration request; however, in a range of driving command, of which a usage time is long, the driving command may significantly vary to some degree for a small variation of an accelerator operation amount, that is, the operability of accelerator operation may be not good.

The present disclosure provides a control system that provides good operability of accelerator operation in a range of driving command, of which a usage time is long among values of driving command.

Some aspects of the control system of the present disclosure are configured as follows.

An aspect of the present disclosure provides a control system. The control system includes a control unit configured to control a driving apparatus by using a driving command, the driving command being obtained by applying an accelerator operation amount to a relation between the accelerator operation amount and the driving command of the driving apparatus, and a relation setting unit configured to set the relation by using a distribution of usage of the driving command by a driver such that a gradient that is a change in the driving command with a change in the accelerator operation amount in a high usage range including a value having a longest usage time among values of the driving command is less than the gradient in a range other than the high usage range.

With the control system according to the aspect of the present disclosure, a driving apparatus is controlled by using a driving command that is obtained by applying an accelerator operation amount to a relation between the accelerator operation amount and the driving command of the driving apparatus, and the relation is set by using a distribution of usage of the driving command by a driver such that a gradient that is a change in the driving command with a change in the accelerator operation amount in a high usage range including a value having a longest usage time among values of the driving command is less than the gradient in a range other than the high usage range. Therefore, the relation is set such that the gradient in the high usage range is less than the gradient in the range other than the high usage range, so it is possible to reduce variations in driving command due to small variations in accelerator operation amount in the high usage range. As a result, good operability of accelerator operation is obtained in the high usage range.

In the control system according to the aspect of the present disclosure, the relation setting unit may be configured to set the high usage range to a range less than or equal to the value having the longest usage time among the values of the driving command or a value obtained by adding a margin to the value having the longest usage time among the values of the driving command. The relation setting unit may be configured to stabilize the gradient in the high usage range. With these configurations, the relation between the accelerator operation amount and the driving command for the driving apparatus in the high usage range is easily set.

In the control system according to the aspect of the present disclosure, the control unit may be configured to change the relation at startup of the control system. With this configuration, a feeling of strangeness experienced by a driver due to a change of the relation is reduced.

The control system according to the aspect of the present disclosure may further include an authentication unit configured to authenticate a driver. The relation setting unit may be configured to set the relation by using a distribution of usage of the driving command by an authenticated person that is the driver authenticated by the authentication unit. With this configuration, it is possible to set the relation for each authenticated person, so, even when the same driving apparatus is shared among multiple users, the relation between the accelerator operation amount and the driving command is further appropriately set.

In the control system according to the aspect of the present disclosure, the control system may include a first controller and a second controller configured to be capable of communicating with each other, the control system may further include a data collection unit configured to send a driver and the driving command to the second controller in association with each other, the first controller may include the control unit and the data collection unit, the second controller may include the relation setting unit, and the relation setting unit may be configured to set the distribution of usage and the relation by using the driver and the driving command, associated with each other, from the data collection unit and send the relation to the first controller. With this configuration, the first controller does not need to generate a distribution of usage, so it is possible to reduce a storage capacity of the first controller.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 4 is a flowchart that shows an example of a server process routine that is executed by a cloud server;

FIG. 5 is a view illustrating an example of a usage time map; and

DETAILED DESCRIPTION OF EMBODIMENTS

An embodiment of the present disclosure will be described.

Figure 1:
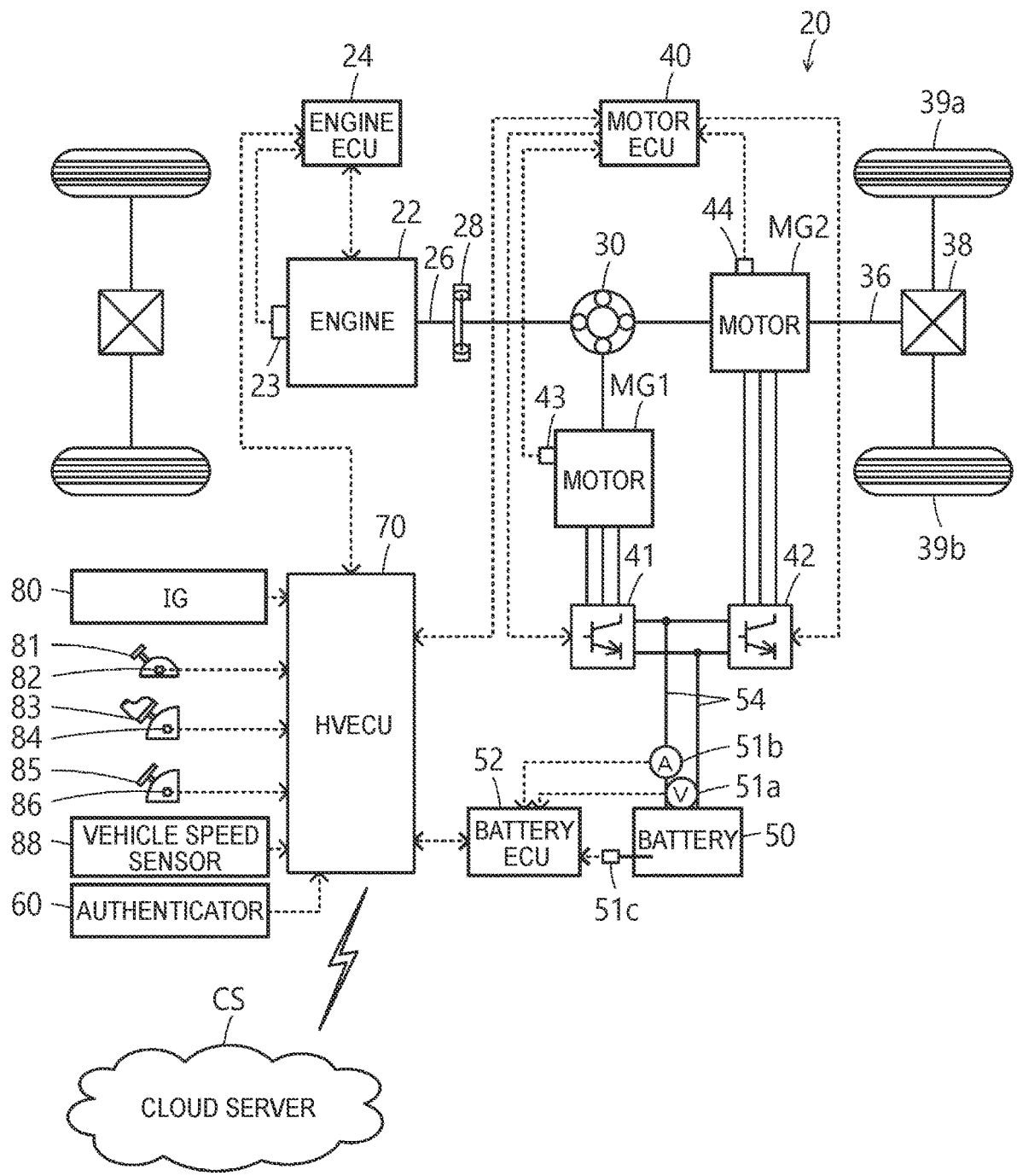
FIG. 1 is a configuration diagram that schematically shows the configuration of a hybrid automobile according to an embodiment of the present disclosure.

FIG. 1 is a configuration diagram that schematically shows the configuration of a hybrid automobile 20 according to the embodiment of the present disclosure. As shown in the drawing, the hybrid automobile 20 of the embodiment includes an engine 22, a planetary gear 30, motors MG1, MG2, inverters 41, 42, a battery 50, an authenticator 60, and a hybrid electronic control unit (hereinafter, referred to as HVECU) 70.

The engine 22 is an internal combustion engine that outputs power by using gasoline, light oil, or the like as fuel. The operation of the engine 22 is controlled by an engine electronic control unit (hereinafter, referred to as engine ECU) 24.

Although not shown in the drawing, the engine ECU 24 is a microprocessor that mainly includes a CPU. The engine ECU 24, in addition to the CPU, includes ROM that stores process programs, RAM that temporarily stores data, input and output ports, and a communication port. Signals required to control the operation of the engine 24 are input from various sensors to the engine ECU 24 via the input port. Examples of signals that are input to the engine ECU 24 include a crank angle θcr of a crankshaft 26 from a crank position sensor 23 that detects the rotation position of the crankshaft 26 of the engine 22.

Various control signals for controlling the operation of the engine 22 are output from the engine ECU 24 via the output port. Examples of signals that are output from the engine ECU 24 include control signals to a throttle motor that drives a throttle valve, a fuel injection valve, and an ignition plug (any of which is not shown). The engine ECU 24 is connected to the HVECU 70 via the communication port. The engine ECU 24 computes the rotation speed Ne of the engine 22 based on the crank angle θcr from the crank position sensor 23.

The planetary gear 30 is a single-pinion planetary gear train. A rotor of the motor MG1 is connected to a sun gear of the planetary gear 30. A drive shaft 36 coupled to drive wheels 39a, 39b via a differential gear 38 is connected to a ring gear of the planetary gear 30. The crankshaft 26 of the engine 22 is connected to a carrier of the planetary gear 30 via a damper 28.

The motor MG1 is, for example, a synchronous generator-motor. As described above, the rotor of the motor MG1 is connected to the sun gear of the planetary gear 30. The motor MG2 is, for example, a synchronous generator-motor. A rotor of the motor MG2 is connected to the drive shaft 36. The inverters 41, 42 are used to drive the motors MG1, MG2, respectively. The inverters 41, 42 each are connected to the battery 50 via power lines 54. Each of the motors MG1, MG2 is driven for rotation by a motor electronic control unit (hereinafter, referred to as motor ECU) 40 executing switching control over multiple switching elements (not shown) of an associated one of the inverters 41, 42.

Although not shown in the drawing, the motor ECU 40 is a microprocessor that mainly includes a CPU and that, in addition to the CPU, further includes ROM that stores process programs, RAM that temporarily stores data, input and output ports, and a communication port. Signals required to control the drive of the motors MG1, MG2 are input from various sensors to the motor ECU 40 via the input port. Examples of signals that are input to the motor ECU 40 include rotation positions θm1, θm2 of the rotors of the motors MG1, MG2 from rotation position sensors 43, 44, and phase currents Iu1, Iv1, Iu2, Iv2 of the phases of the motors MG1, MG2 from current sensors (not shown). The rotation position sensors 43, 44 respectively detect the rotation positions of the rotors of the motors MG1, MG2. The current sensors respectively detect the phase currents that flow through the phases of the motors MG1, MG2. Switching control signals and the like are output from the motor ECU 40 to the multiple switching elements (not shown) of the inverters 41, 42 via the output port. The motor ECU 40 is connected to the HVECU 70 via the communication port. The motor ECU 40 computes the electric angle θe1 and the rotation speed Nm1 of the motor MG1 based on the rotation position θm1 of the rotor of the motor MG1 from the rotation position sensor 43. Similarly, the motor ECU 40 computes the electric angle θe2 and the rotation speed Nm2 of the motor MG2 based on the rotation position θm2 of the rotor of the motor MG2 from the rotation position sensor 44.

The battery 50 is, for example, a lithium ion secondary battery or a nickel-metal hydride secondary battery and, as described above, connected to the inverters 41, 42 via the power lines 54. The battery 50 is managed by a battery electronic control unit (hereinafter, referred to as battery ECU) 52.

Although not shown in the drawing, the battery ECU 52 is a microprocessor that mainly includes a CPU and that, in addition to the CPU, further includes ROM that stores process programs, RAM that temporarily stores data, input and output ports, and a communication port. Signals required to manage the battery 50 are input from various sensors to the battery ECU 52 via the input port. Examples of signals that are input to the battery ECU 52 include the voltage Vb of the battery 50 from a voltage sensor 51a, the current Ib of the battery 50 from a current sensor 51b, and the temperature Tb of the battery 50 from a temperature sensor 51c. The voltage sensor 51a is connected between the terminals of the battery 50. The current sensor 51b is connected to the output terminal of the battery 50. The temperature sensor 51c is connected to the battery 50. The battery ECU 52 is connected to the HVECU 70 via the communication port. The battery ECU 52 computes a state of charge SOC based on an accumulated value of the current Ib of the battery 50 from the current sensor 51b. A state of charge SOC is the percentage of the capacity of dischargeable electric power from the battery 50 to the total capacity of the battery 50.

The authenticator 60 is a biometric authentication device, such as a face authenticator, an iris authenticator, a fingerprint authenticator, and a vein authenticator, and authenticates a driver. Hereinafter, a driver authenticated by the authenticator 60 may be referred to as authenticated person.

Although not shown in the drawing, the HVECU 70 is a microprocessor that mainly includes a CPU and that, in addition to the CPU, further includes ROM that stores process programs, RAM that temporarily stores data, nonvolatile flash memory, input and output ports, and a communication port. Signals from various sensors are input to the HVECU 70 via the input port. Examples of signals that are input to the HVECU 70 include an ignition signal from an ignition switch 80 and a shift position SP from a shift position sensor 82. The shift position sensor 82 detects the operating position of a shift lever 81. Examples of signals that are input to the HVECU 70 also include an accelerator operation amount Acc from an accelerator pedal position sensor 84, a brake pedal position BP from a brake pedal position sensor 86, and a vehicle speed V from a vehicle speed sensor 88. The accelerator pedal position sensor 84 detects the depression amount of an accelerator pedal 83. The brake pedal position sensor 86 detects the depression amount of a brake pedal 85. Examples of signals that are input to the HVECU 70 further include information of authenticated persons from the authenticator 60. As described above, the HVECU 70 is connected to the engine ECU 24, the motor ECU 40, and the battery ECU 52 via the communication port. The HVECU 70 is also configured to be capable of wirelessly communicating with a cloud server CS. The cloud server CS is configured to be capable of wirelessly communicating with vehicles including the hybrid automobile 20. The cloud server CS stores running history information and the like of the vehicles.

The hybrid automobile 20 of the thus configured first embodiment runs in an electric drive mode (EV drive mode) or a hybrid drive mode (HV drive mode). In the electric drive mode (EV drive mode), the hybrid automobile 20 runs without operating the engine 22. In the hybrid drive mode (HV drive mode), the hybrid automobile 20 runs while operating the engine 22.

Figure 2:
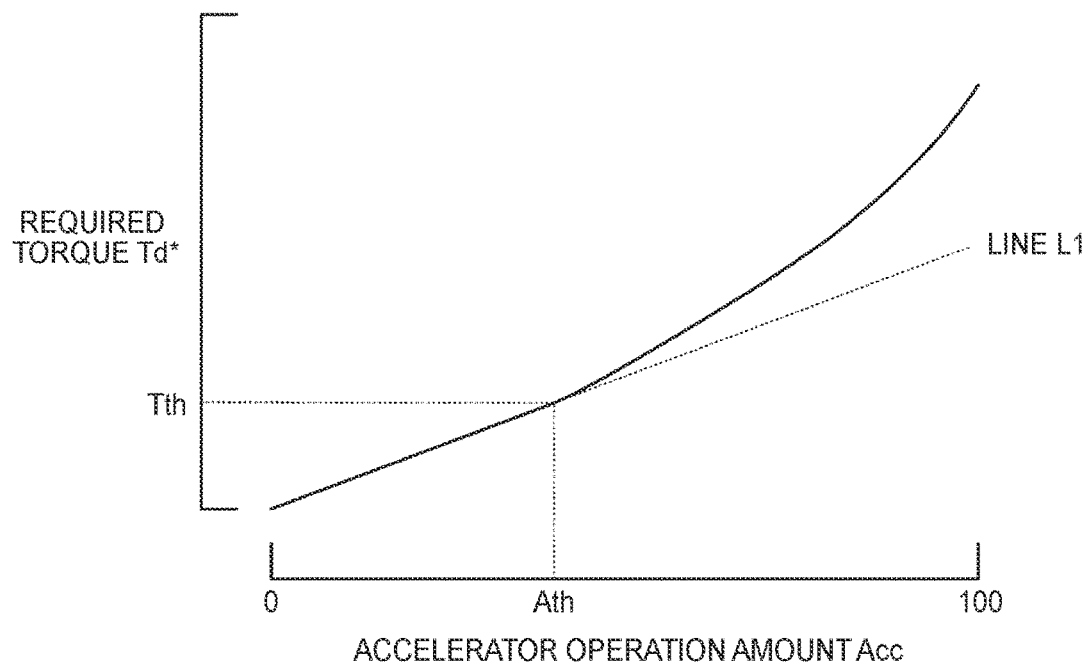
FIG. 2 is a view illustrating an example of a required torque setting map.

In the EV drive mode, the HVECU 70 initially sets a required torque Td* required to run (required of the drive shaft 36) by using an accelerator operation amount Acc and a required torque setting map of FIG. 2. The required torque setting map of FIG. 2 is determined as a relation between an accelerator operation amount Acc and a required torque Td* and is stored in the nonvolatile flash memory (not shown). In the example of FIG. 2, the required torque setting map is set such that a required torque Td* increases along a line (linear function) L1 having a relatively small gradient (a change in required torque Td* with a change in accelerator operation amount Acc) with an increase in the accelerator operation amount Acc in a range in which the accelerator operation amount Acc is higher than or equal to 0% and lower than or equal to a value Ath (a range in which the required torque Td* is less than or equal to a value Tth). With this configuration, it is possible to easily set the relation in this range between the accelerator operation amount Acc and the required torque Td*. In addition, the required torque setting map is set such that the required torque Td* increases along a curve having a greater gradient than the gradient of the line L1 with an increase in the accelerator operation amount Acc in a range in which the accelerator operation amount Acc is higher than or equal to the value Ath and lower than or equal to 100% (a range in which the required torque Td* is greater than the value Tth).

Subsequently, the HVECU 70 sets the torque command Tm1* of the motor MG1 to zero and sets the torque command Tm2* of the motor MG2 such that the required torque Td* is output to the drive shaft 36, and sends the set torque commands Tm1*, Tm2* of the motors MG1, MG2 to the motor ECU 40. When the motor ECU 40 receives the torque commands Tm1*, Tm2* of the motors MG1, MG2, the motor ECU 40 executes switching control over the switching elements of the inverter 41 such that the motor MG1 is driven in accordance with the torque command Tm1*, and also executes switching control over the switching elements of the inverter 42 such that the motor MG2 is driven in accordance with the torque command Tm2*.

In the HV drive mode, the HVECU 70 initially sets the required torque Td* as in the case of the EV drive mode. Subsequently, the HVECU 70 computes a required power Pd* required to run by multiplying the required torque Td* by the rotation speed Nd of the drive shaft 36 and computes a required power Pe* required of the engine 22 by subtracting a charge-discharge required power Pb* (which is positive when discharged from the battery 50) of the battery 50 from the required power Pd*. For example, the rotation speed Nm2 of the motor MG2 or a rotation speed obtained by multiplying the vehicle speed V by a conversion coefficient is used as the rotation speed Nd of the drive shaft 36.

Subsequently, the HVECU 70 sets a target rotation speed Ne* and a target torque Te* of the engine 22 and the torque commands Tm1*, Tm2* of the motors MG1, MG2 such that the required power Pe* is output from the engine 22 and the required torque Td* is output to the drive shaft 36. The HVECU 70 sends the target rotation speed Ne* and the target torque Te* of the engine 22 to the engine ECU 24 and sends the torque commands Tm1*, Tm2* of the motors MG1, MG2 to the motor ECU 40. When the engine ECU 24 receives the target rotation speed Ne* and the target torque Te* of the engine 22, the engine ECU 24 executes intake air volume control, fuel injection control, ignition control, and the like over the engine 22 such that the engine 22 is operated based on the received target rotation speed Ne* and the received target torque Te*. Control over the motors MG1, MG2 (inverters 41, 42) by the motor ECU 40 is described above.

Figure 3:
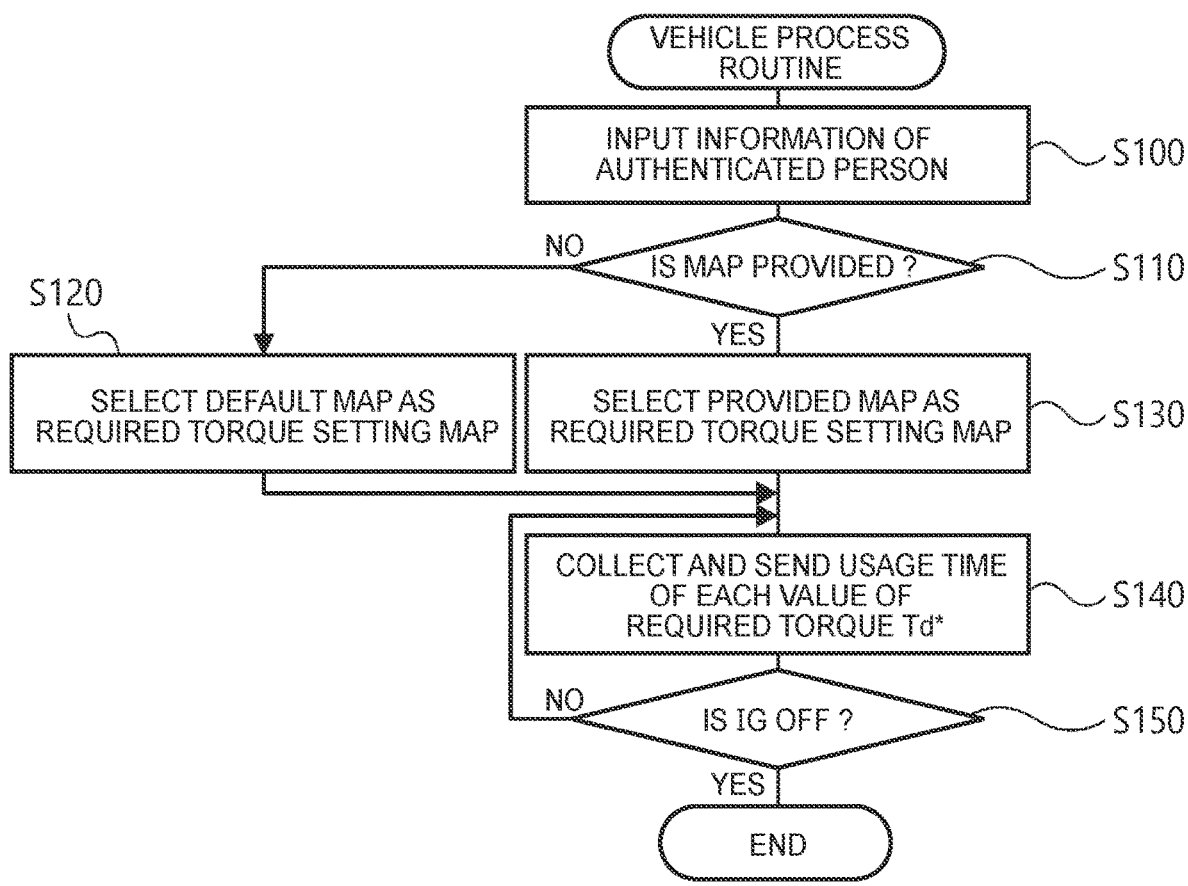
FIG. 3 is a flowchart that shows an example of a vehicle process routine that is executed by an HVECU.

Next, the operations of the hybrid automobile 20 and the cloud server CS of the thus configured embodiment will be described. FIG. 3 is a flowchart that shows an example of a vehicle process routine that is executed by the HVECU 70. FIG. 4 is a flowchart that shows an example of a server process routine that is executed by the cloud server CS. Hereinafter, the operations will be sequentially described.

The vehicle process routine of FIG. 3 will be described. This routine is executed when the ignition switch 80 is turned on. When the routine is executed, the HVECU 70 initially inputs information of an authenticated person (authenticated driver) from the authenticator 60 (step S100). Subsequently, the HVECU 70 determines whether the required torque setting map for the authenticated person has been provided from the cloud server CS (step S110).

When the HVECU 70 determines that the required torque setting map for the authenticated person has not been provided from the cloud server CS, the HVECU 70 selects a default map stored in the flash memory (not shown) as the required torque setting map for the authenticated person (step S120). In contrast, when the HVECU 70 determines that the required torque setting map for the authenticated person has been provided from the cloud server CS, the HVECU 70 selects a map provided from the cloud server CS and stored in the flash memory as the required torque setting map for the authenticated person (step S130). When the HVECU 70 selects the required torque setting map, the HVECU 70 sets a required torque Td* by applying an accelerator operation amount Acc to the selected map and controls the engine 22 and the motors MG1, MG2 by using the set required torque Td*.

At this time, the HVECU 70 collects a usage time of each value of the required torque Td* and periodically (for example, at intervals of about several hundred milliseconds to several seconds) sends the usage time of each value of the required torque Td* to the cloud server CS (step S140) and determines whether the ignition switch 80 is turned off (the current trip is finished) (step S150). When the HVECU 70 determines that the ignition switch 80 is not turned off, the HVECU 70 returns to step S140.

The HVECU 70 repeatedly executes step S140 and step S150 in this way. When the HVECU 70 determines that the ignition switch 80 is turned off, the HVECU 70 ends the routine. In this way, the HVECU 70 periodically sends a usage time of each value of the required torque Td* to the cloud server CS until the ignition switch 80 is turned off.

Next, the server process routine of FIG. 4 will be described. This routine is repeatedly executed when the cloud server CS is able to communicate with the hybrid automobile 20. A similar process is also executed on vehicles other than the hybrid automobile 20.

When the server process routine of FIG. 4 is executed, the cloud server CS receives a usage time Tus of each value of the required torque Td* from the hybrid automobile 20 (step S200) and updates a usage time map that is a relation between a required torque Td* and a usage time Tus (step S210). FIG. 5 is a view that illustrates an example of the usage time map. A usage time map is prepared or updated in association with an authenticated person.

Subsequently, the cloud server CS computes a total usage time Tsum as an accumulated value of a usage time Tus of each value of the required torque Td* (step S220), compares the total usage time Tsum with a threshold Tref (step S230), and, when the total usage time Tsum is shorter than the threshold Tref, returns to step S200. The threshold Tref is determined as a time by which it may be determined that a total usage time Tsum is sufficiently long (the reliability of a usage time map is sufficient). For example, about several hours or several tens of hours are used.

When the total usage time Tsum is greater than or equal to the threshold Tref in step S230, the cloud server CS prepares a required torque setting map by using the usage time map and sends the required torque setting map to the hybrid automobile 20 (step S240), resets the usage time map and the total usage time Tsum (step S250), and then ends the routine.

Figure 6:
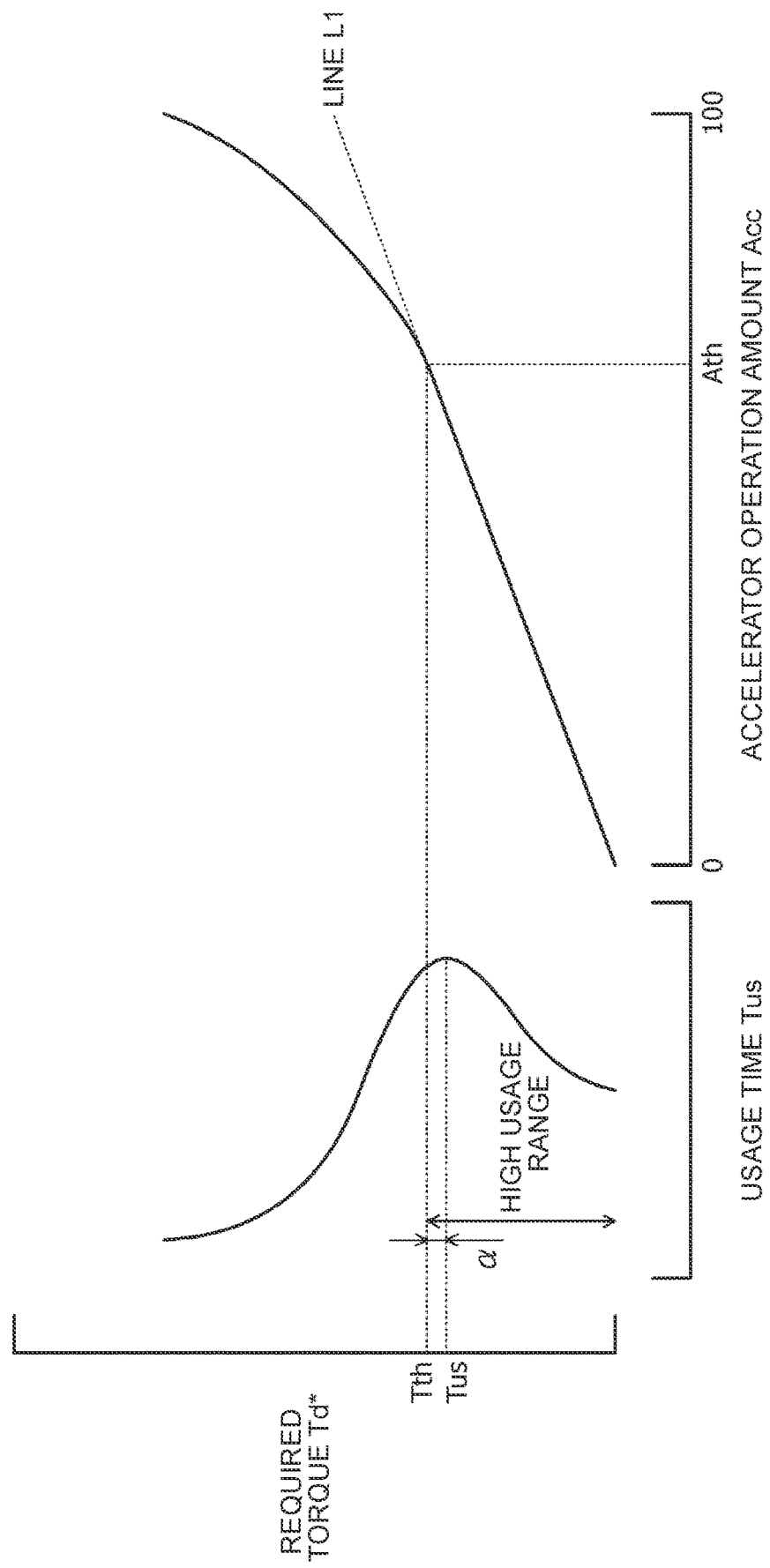
FIG. 6 is a view illustrating an example of a method of preparing the required torque setting map.

FIG. 6 is a view that illustrates an example of a method of preparing a required torque setting map. In FIG. 6, the left side represents a usage time map, and the right side represents a required torque setting map. A required torque setting map is prepared, for example, as follows. Initially, a value Tus having the longest usage time among values of the required torque Td* is set from the usage time map, a value Tth is set by adding a margin α to the value Tus, and a range in which the required torque Td* is less than or equal to the value Tth is set as a high usage range. Subsequently, for a range in which the required torque Td* is less than or equal to the value Tth (a range in which the accelerator operation amount Acc is higher than or equal to 0% and lower than or equal to the value Ath at the intersection between the value Tth and the line L1 (same as FIG. 2)), that is, the high usage range, the required torque setting map is set such that the required torque Td* increases along the line L1 with an increase in the accelerator operation amount Acc. Thus, it is possible to easily set the relation in the high usage range between an accelerator operation amount Acc and a required torque Td*. For a range in which the required torque Td* is greater than the value Tth (a range in which the accelerator operation amount Acc is higher than the value Ath and lower than or equal to 100%), that is, a range other than the high usage range, the required torque setting map is set such that the required torque Td* increases along a curve having a greater gradient than the gradient of the line L1 with an increase in accelerator operation amount Acc.

In this way, when the cloud server CS prepares the required torque setting map and sends the required torque setting map to the hybrid automobile 20, the HVECU 70 of the hybrid automobile 20 stores the received required torque setting map in the flash memory (not shown). As described above, when the ignition switch 80 is turned on next time or later, the HVECU 70 determines that the required torque setting map for the authenticated person has been provided from the cloud server CS and selects the map provided from the cloud server CS and stored in the flash memory as the required torque setting map for the authenticated person. Then, the engine 22 and the motors MG1, MG2 are controlled by using a required torque Td* obtained by applying an accelerator operation amount Acc to the selected required torque setting map, so variations in required torque Td* due to small variations in accelerator operation amount Acc in a high usage range are reduced. As a result, good operability of the accelerator pedal 83 is obtained in the high usage range.

In addition, the required torque setting map is changed only when the ignition switch 80 is turned on and a driver is authenticated (set as an authenticated person), that is, the required torque setting map is not changed during running or stop thereafter in the same trip, so a feeling of strangeness resulting from a change of the required torque setting map is less likely to be experienced by the driver.

Furthermore, when the ignition switch 80 is turned on and a driver is authenticated (set as an authenticated person), a required torque setting map for the authenticated person is selected, so, even when the hybrid automobile 20 is shared by multiple users, it is possible to further appropriately set the relation between an accelerator operation amount Acc and a required torque Td* for each user.

In addition, the HVECU 70 of the hybrid automobile 20 periodically sends a usage time Tus of each value of the required torque Td* to the cloud server CS, and the cloud server CS collects the usage time Tus of each value of the required torque Td*, prepares or updates a usage time map, prepares a required torque setting map by using the usage time map, and sends the required torque setting map to the hybrid automobile 20. Therefore, the storage capacity of the flash memory (not shown) of the HVECU 70 may be reduced.

The cloud server CS of the above-described embodiment sets the required torque setting map such that a range less than or equal to a value Tth obtained by adding a margin α to a value Tus having the longest usage time among values of the required torque Td* of the hybrid automobile 20 is set as a high usage range and a gradient (a change in required torque Td* with a change in accelerator operation amount Acc) in the high usage range is less than the gradient of a range other than the high usage range. The hybrid automobile 20 controls the engine 22 and the motors MG1, MG2 so as to run by using a required torque Td* obtained by applying an accelerator operation amount Acc to the required torque setting map set and provided by the cloud server CS. Thus, it is possible to reduce variations in required torque Td* resulting from small variations in accelerator operation amount Acc in the high usage range. As a result, good operability of accelerator operation is obtained in the high usage range.

In the embodiment, the cloud server CS sets the required torque setting map such that a range less than or equal to a value Tth obtained by adding a margin α to a value Tus having the longest usage time among values of the required torque Td* of the hybrid automobile 20 is set as a high usage range and a gradient (a change in required torque Td* with a change in accelerator operation amount Acc) in the high usage range is less than the gradient of a range other than the high usage range. Alternatively, the margin α may be set to zero, that is, the value Tus may be set to the value Tth. A range greater than or equal to a value obtained by subtracting a margin β from the value Tus and less than or equal to the value Tth may be set as a high usage range.

In the embodiment, the cloud server CS sets the required torque setting map such that, for the range in which the required torque Td* is less than or equal to the value Tth, that is, the high usage range, the required torque Td* increases (the gradient becomes constant) along the line L1 with an increase in accelerator operation amount Acc. Alternatively, the cloud server CS may set the required torque setting map such that, in the high usage range, the required torque Td* increases along a curve having a relatively smaller gradient with an increase in accelerator operation amount Acc.

In the present embodiment, the HVECU 70 of the hybrid automobile 20 periodically sends a usage time Tus of each value of the required torque Td* to the cloud server CS, and the cloud server CS collects the usage time of each value of the required torque Td*, prepares or updates a usage time map, prepares a required torque setting map by using the usage time map, and sends the required torque setting map to the hybrid automobile 20. Alternatively, the HVECU 70 may be configured to prepare or update a usage time map and prepare a required torque setting map.

In the embodiment, the HVECU 70 of the hybrid automobile 20 controls the engine 22 and the motors MG1, MG2 by using a required torque Td* obtained by applying an accelerator operation amount Acc to the required torque setting map. Alternatively, the HVECU 70 may, based on a vehicle speed V, correct a required torque Td* obtained by applying an accelerator operation amount Acc to the required torque setting map, and control the engine 22 and the motors MG1, MG2 by using the corrected required torque Td*. A required torque setting map may be determined as a relation between an accelerator operation amount Acc and a required torque Td* for each vehicle speed V. In this case, it is desirable that a usage time Tus of each value of a required torque Td* be obtained for each vehicle speed V (see FIG. 5) and a required torque setting map be prepared (see FIG. 6).

In the embodiment, the case where the hybrid automobile 20 including the engine 22 and the motors MG1, MG2 uses the required torque setting map (the relation between an accelerator operation amount Acc and a required torque Td*) is described. However, it may be similarly considered when a required torque setting map is used in hybrid automobiles other than the hybrid automobile 20, electric automobiles including a drive motor without including an engine, ordinary automobiles including an engine and not including a drive motor, vehicles other than automobiles, ships, airplanes, and the like. It may also be similarly considered when a required torque setting map is used in stationary equipment, such as construction equipment.

The correspondence relationship between major elements of the embodiment and major elements of the present disclosure described in Summary will be described. In the embodiment, the HVECU 70, the engine ECU 24, and the motor ECU 40 may be regarded as the control unit, and the cloud server CS may be regarded as the relation setting unit. The authenticator 60 may be regarded as the authentication unit. The HVECU 70 may also be regarded as the data collection unit.

The correspondence relationship between major elements of the embodiment and major elements of the present disclosure described in Summary does not limit the elements of the present disclosure described in the Summary since the embodiment is an example for specifically describing the aspects of the present disclosure described in the Summary. In other words, the present disclosure described in the Summary should be interpreted based on the description therein, and the embodiment is only a specific example of the present disclosure described in the Summary.

The embodiment of the present disclosure is described above; however, an applicable embodiment of the present disclosure is not limited to the embodiment and may be, of course, modified into various forms without departing from the scope of the present disclosure.

The present disclosure is usable in the industry of manufacturing control systems.

What is claimed is:

1. A control system comprising:
   a control unit configured to control a driving apparatus by using a driving command, the driving command being obtained by applying an accelerator operation amount to a relation between the accelerator operation amount and the driving command for the driving apparatus;
   a relation setting unit configured to set the relation by using a usage time map that is a relation between the driving command and a usage time by a driver, such that a gradient that is a change in the driving command with a change in the accelerator operation amount in a high usage range including a value having a longest usage time among values of the driving command is less than the gradient in a range other than the high usage range; and
   an authentication unit configured to authenticate a driver, wherein the relation setting unit is configured to set the relation by using a distribution of usage of the driving command by an authenticated person that is the driver authenticated by the authentication unit.

2. The control system according to claim 1, wherein the relation setting unit is configured to set the high usage range to a range less than or equal to the value having the longest usage time among the values of the driving command or a value obtained by adding a margin to the value having the longest usage time among the values of the driving command.

3. The control system according to claim 1, wherein the relation setting unit is configured to stabilize the gradient in the high usage range.

4. The control system according to claim 1, wherein the control unit is configured to change the relation at startup of the control system.

5. The control system according to claim 1, wherein:
the control system includes a first controller and a second controller that are configured to be capable of communicating with each other;
the control system further comprises a data collection unit configured to send a driver and the driving command to the second controller in association with each other;
the first controller includes the control unit and the data collection unit;
the second controller includes the relation setting unit; and
the relation setting unit is configured to set the distribution of usage and the relation by using the driver and the driving command, associated with each other, from the data collection unit and send the relation to the first controller.

6. A control system comprising:
a processor programmed to control a driving apparatus by using a driving command, the driving command being obtained by applying an accelerator operation amount to a relation between the accelerator operation amount and the driving command for the driving apparatus;
a server configured to set the relation by using a usage time map that is a relation between the driving command and a usage time by a driver, such that a gradient that is a change in the driving command with a change in the accelerator operation amount in a high usage range including a value having a longest usage time among values of the driving command is less than the gradient in a range other than the high usage range; and
a biometric authenticator configured to authenticate a driver, wherein the server is configured to set the relation by using a distribution of usage of the driving command by an authenticated person that is the driver authenticated by the biometric authenticator.

* * * * *